(12) United States Patent
Ohmura

(10) Patent No.: US 9,318,845 B2
(45) Date of Patent: Apr. 19, 2016

(54) CHARGING CONNECTOR

(71) Applicant: YAZAKI CORPORATION, Minato-ku, Tokyo (JP)

(72) Inventor: Takenori Ohmura, Kakegawa (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 14/873,251

(22) Filed: Oct. 2, 2015

(65) Prior Publication Data

US 2016/0028184 A1   Jan. 28, 2016

Related U.S. Application Data

(63) Continuation of application No. PCT/JP2014/060136, filed on Apr. 8, 2014.

(30) Foreign Application Priority Data

Apr. 8, 2013 (JP) ................................. 2013-080094

(51) Int. Cl.
   *H01R 13/627* (2006.01)
(52) U.S. Cl.
   CPC .................. *H01R 13/6275* (2013.01)
(58) Field of Classification Search
   CPC ........... H01R 13/6275; H01R 13/6273; H01R 13/641
   USPC ................................................. 439/352, 372
   See application file for complete search history.

(56) References Cited

U.S. PATENT DOCUMENTS

| 5,820,395 A * | 10/1998 | Hashizawa .......... B60L 11/1818 439/271 |
| 8,573,998 B2 * | 11/2013 | Ichio ................... B60L 11/1818 439/358 |
| 2006/0272364 A1 | 12/2006 | Mase et al. |
| 2012/0045923 A1 * | 2/2012 | Ohmura ........... H01R 13/62933 439/372 |
| 2015/0214673 A1 * | 7/2015 | Gao ................... H01R 13/6597 439/352 |

FOREIGN PATENT DOCUMENTS

| JP | 2006-196227 A | 7/2006 |
| JP | 2006-324135 A | 11/2006 |
| JP | 2010-182513 A | 8/2010 |

(Continued)

OTHER PUBLICATIONS

International Search Report for PCT/JP2014/060136 dated Jul. 8, 2014 [PCT/ISA/210].

(Continued)

*Primary Examiner* — Briggitte R Hammond
(74) *Attorney, Agent, or Firm* — Sughrue Mion, PLLC

(57) ABSTRACT

In the charging connector, in a movement process of a release lever from a start position to a completion position, a holding locking piece moves on a plane surface of the release lever with an urging force of a coil spring, and also an auxiliary locking piece slides over a top point between the plane surface and an inclined surface with an urging force of a coil spring. At the completion position of the release lever, the holding locking piece falls from the plane surface of the release lever to an upper-side locking groove portion with the urging force of the coil spring to be locked on a locking surface, and thus a tip end of the holding locking piece does not come into contact with a bottom surface.

3 Claims, 14 Drawing Sheets

(56) References Cited

FOREIGN PATENT DOCUMENTS

| | | | |
|---|---|---|---|
| JP | 2012-234702 | A | 11/2012 |
| JP | 2012-234775 | A | 11/2012 |

OTHER PUBLICATIONS

Written Opinion for PCT/JP2014/060136 dated Jul. 8, 2014 [PCT/ISA/237].

\* cited by examiner

CHARGING CONNECTOR

CROSS REFERENCE TO RELATED APPLICATIONS

This application is a continuation application of International Application No. PCT/JP2014/060136, filed on Apr. 8, 2014, which claims priority to Japanese Patent Application No. 2013-080094, filed on Apr. 8, 2013, the entire contents of which are incorporated by reference herein.

BACKGROUND

1. Technical Field

The present invention relates to a charging connector and, particularly, to a charging connecter to be fitted into a vehicle-side inlet provided in a vehicle.

2. Description of the Related Art

In recent years, due to improvement of environmental consciousness, an electric vehicle (e.g., electric vehicle (EV) and a hybrid electric vehicle (HEV)) is being eagerly promoted which mounts an accumulator battery (hereinafter, referred to as "battery") and is capable of running by a motor driven by an electric power of the battery. As infrastructure development for such a vehicle, a charging device has been developed. With reference to FIG. 14, an example of charging connectors at a charging device side will be described.

As illustrated in FIG. 14, a charging connector 100 includes a connector case 110 storing a connector fitting portion 111 fitting into a vehicle-side inlet (not shown), a plurality of swinging members 120A, 120B formed with protruding claws 121A, 121B at a tip end of the charging connector 100 and locking pieces 122A, 122B at a backend thereof, and a release lever 130 having locking surfaces 131, 132 on which locking pieces 122A, 122B are locked together, respectively.

The swinging members 120A, 120B are urged by a spring 123B (the other spring is not shown) in a locking direction of the locking pieces 122A, 122B on the locking surfaces 131, 132, respectively. Further, the release lever 130 is urged by a spring 133 to a start position side of a push-in operation.

When such a charging connector 100 is inserted into the vehicle-side inlet, the protruding claw 121A of one swinging member 120A comes into contact with an inner circumferential surface of the vehicle-side inlet to be pushed into a notch (not shown) formed on an outer circumferential surface of the connector fitting portion 111. When the charging connector 100 is inserted most inside the vehicle-side inlet (i.e., becomes in a completely fitted state), the protruding claw 121A of the one swinging member 120A protrudes from the notch (not shown) of the connector fitting portion 111 to be locked into a recessed portion (not shown) provided on the inner circumferential surface of the vehicle-side inlet, so that the charging connector 100 is locked to the vehicle-side inlet. At this point, the protruding claw 121B of the other swinging member 120B abuts on a tip end surface of the vehicle-side inlet to be pushed into the notch (not shown) of the connector fitting portion 111, and then detects the completely fitted state of the charging connector 100.

On the other hand, when the charging connector 100 is removed from the vehicle-side inlet after power is supplied to the battery, the release lever 130 is operated to be pushed in and, first, a tip end portion 134 of the release lever 130 abuts on one locking piece 122A to push up the one swinging member 120A. With this arrangement, the protruding claws 121A, 121B of the swinging members 120A, 120B respectively are pushed into the notch of the connector fitting portion 111 (not shown), so that the charging connector 100 can be removed from the vehicle-side inlet. At this point, since the locking pieces 122A, 122B are locked on the locking surfaces 131, 132 respectively, the release lever 130 is blocked from moving to the start position side of the push-in operation.

SUMMARY OF THE INVENTION

However, according to a conventional charging connector 100 described above, during the push-in operation of the release lever 130, when the locking pieces 122A, 122B are locked on locking surfaces 131, 132 respectively, interference sound (collision sound) is generated when they are locked together (i.e., the sound is generated two times).

At this point, the interference sound generated first may cause an operator to stop the push-in operation of the release lever 130, since he may have misconception that the push-in operation of the release lever 130 has been completed. In this case, the connector fitting portion 111 may not be able to be removed from the vehicle-side inlet, and thus a problem (e.g., damage of one claw portion 121A) may occur caused by forcibly pulling out the connector fitting portion 111 from the vehicle-side inlet.

An object of the present invention is to provide the charging connector that can reduce the interference sound of the locking portion of the swinging member that is first locked on the locking surface of the release lever so as to prevent the push-in operation of the release lever from being stopped.

An aspect of the present invention is a charging connector including a release lever configured to move between a start position and a completion position of a push-in operation and be urged to a side of the start position, and having a locking groove portion including a locking surface that falls from a plane surface along a movement direction and a bottom surface; a lever holding arm swingably provided between a lever holding position where the release lever is held at the completion position and a lever non-holding position, and configured to be urged by a first urging unit in a locking direction of a first locking portion locked on the locking surface; and a locking auxiliary arm swingably provided between a locking position and a non-locking position on the locking surface, and configured to be urged by a second urging unit in a locking direction of a second locking portion locked on the locking surface, wherein the locking groove portion is set to have a depth in which each tip end of the first locking portion and the second locking portion and the bottom surface do not come into contact with each other; wherein at least one of the locking surface and the second locking portion includes an inclined surface having an angle of less than 90 degrees with respect to the plane surface; wherein, in a movement process of the release lever from the start position to the completion position, the first locking portion moves on the plane surface with an urging force of the first urging unit, and also the second locking portion slides over a top point between the plane surface and the inclined surface with an urging force of the second urging unit; and wherein, at the completion position of the release lever, the first locking portion falls from the plane surface to the locking groove portion with the urging force of the first urging unit to be locked on the locking surface, and the tip end of the first locking portion does not come into contact with the bottom surface.

The locking auxiliary arm may constitute a lock arm together with a lock main arm. The lock main arm is swingably provided between a locking position and a non-locking position with a vehicle-side inlet, and may have an engagement portion locked in the locking groove portion of the release lever at the non-locking position. In a movement process of the release lever from the start position to the completion position, the lock main arm may be located at the locking position. At the completion position of the release lever, the lock main arm may be located at the non-locking position, and also the engagement portion may be locked on the locking surface.

The release lever may have an abutment portion where the release lever abuts on the lock main arm to swing the lock main arm to the non-locking position. The abutment portion may be formed in a curved shape.

According to the present invention, in a movement process of a release lever from a start position to a completion position, a second locking portion comes into contact with only a top point between a plane surface and an inclined surface. Thus, a surface of an inner wall of the second locking portion does not come into contact with a locking surface of the release lever. Therefore, interference sound of the second locking portion against the locking surface can be reduced. On the other hand, at the completion position of the release lever, a first locking portion falls from a plane surface to a locking groove portion to be locked on the locking surface, and thus a surface of the inner wall of the first locking portion comes into contact with the locking surface of the release lever. Therefore, the interference sound of the first locking portion against the locking surface is generated, and an operator can determine that the release lever has moved to the completion position. As described above, the interference sound of the second locking portion to be first locked on the locking surface of the release lever is reduced to prevent the push-in operation of the release lever from being stopped. Therefore, the problem caused by forcibly pulling out a connector fitting portion from the vehicle-side inlet can be prevented.

DESCRIPTION OF THE EMBODIMENTS

Figure 1:
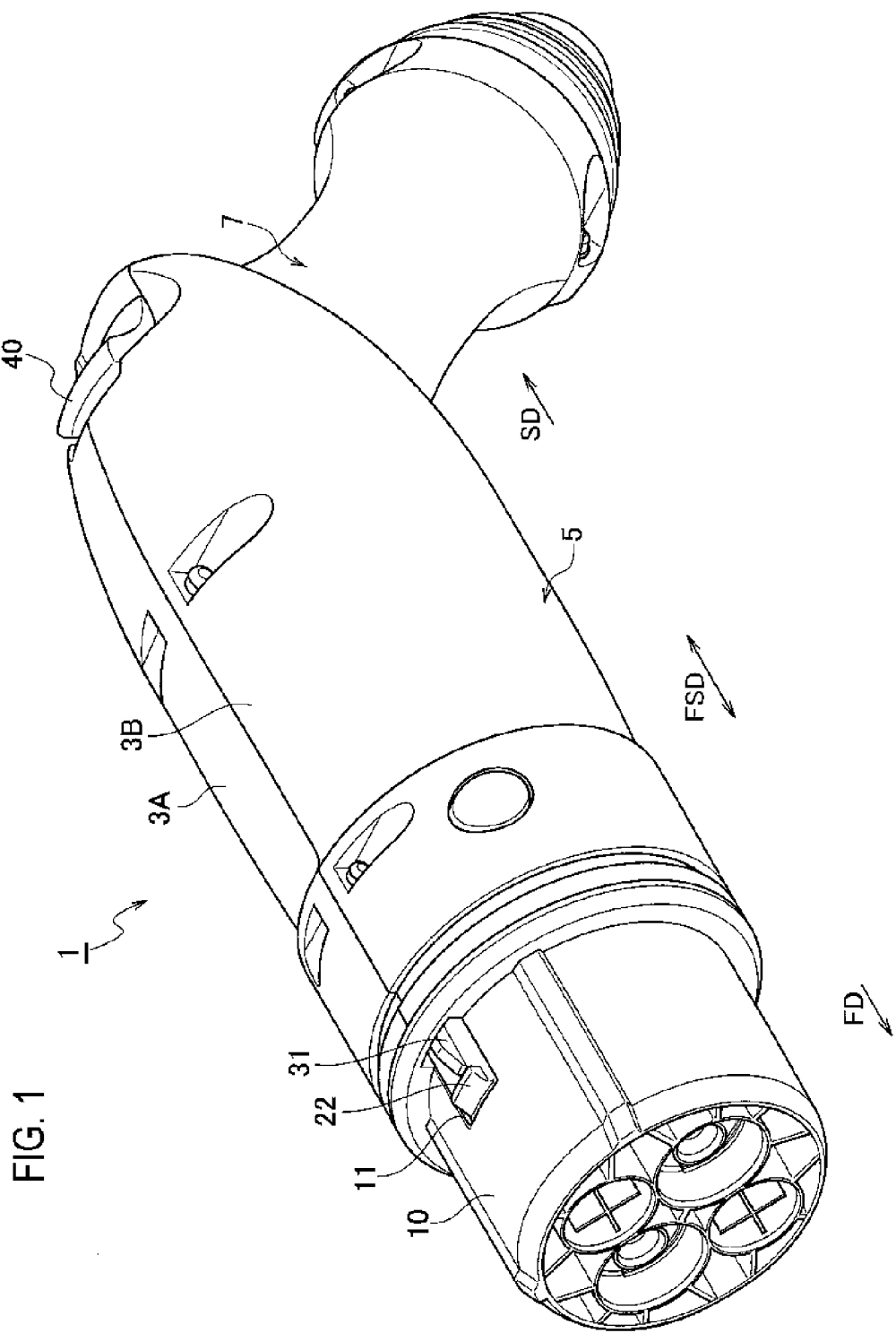
FIG. 1 is a total perspective view illustrating a charging connector according to an embodiment of the present invention.

Subsequently, with reference to figures, embodiments of the charging connector of the present invention will be described. For descriptions with reference to the figures below, a same or similar reference numeral is applied to a same or similar part. However, the figures are schematically drawn, and thus it should be noted that ratios of dimensions are not actual ratios. Therefore, specific dimensions should be determined in consideration of the descriptions below. Further, relationships and ratios of dimensions among the figures can include the different relationships and ratios from the actual ones.

Configuration of Charging Connector

First, with reference to figures, a configuration of a charging connector 1 according to the present embodiment will be described. FIGS. 1 to 5 illustrate the charging connector 1 according to the present embodiment.

For convenience of descriptions, a vehicle-side inlet 90 side of the charging connector 1 (left side of FIGS. 1 to 3, and right side of FIG. 4) is defined as a "tip end side", and a direction toward the tip end side is defined as a "fitting direction FD". Further, an opposite side of the vehicle-side inlet 90 side of the charging connector 1 (right side of FIGS. 1 to 3, and left side of FIG. 4) is defined as a "backend side", and a direction toward the backend side is defined as a "separation direction SD".

As illustrated in FIGS. 1 to 4, the charging connector 1 is fitted into the vehicle-side inlet 90 (refer to FIG. 2) including a reception-side terminal (not shown), and is used to supply the power to the battery of the vehicle. The charging connector 1 is mounted on a leading end of wire W (not shown) extended from a power source supply device (not shown).

The charging connector 1 includes connector cases 3A, 3B serving as two separated bodies in substantially mirror-image symmetry in which their end surfaces are combined with each other. The connector cases 3A, 3B include a case main body portion 5 and a handle portion 7 that inclines from back of the case main body portion 5 to be gripped by the operator. In front of the case main body portion 5, a connector fitting portion 10 fitting into the vehicle-side inlet 90 is provided.

An outer circumferential surface of the connector fitting portion 10 is formed with a notch 11. Inside the connector fitting portion 10, a supply-side terminal (not shown) to be connected to the reception-side terminal (not shown) in the vehicle-side inlet 90 is stored. Arrangement of the supply-side terminals (not shown) is based on each specification, and it is not described herein.

At a lower side in the case main body portion 5, the wire W extended from the connector fitting portion 10 is arranged, and the wire W passes through in the handle portion 7 to be drawn outside. At an upper side in the case main body portion 5, a lock arm 20, a fitting detection arm 30, a release lever 40, and a lever holding arm 50 are provided.

Lock Arm

Figure 2:
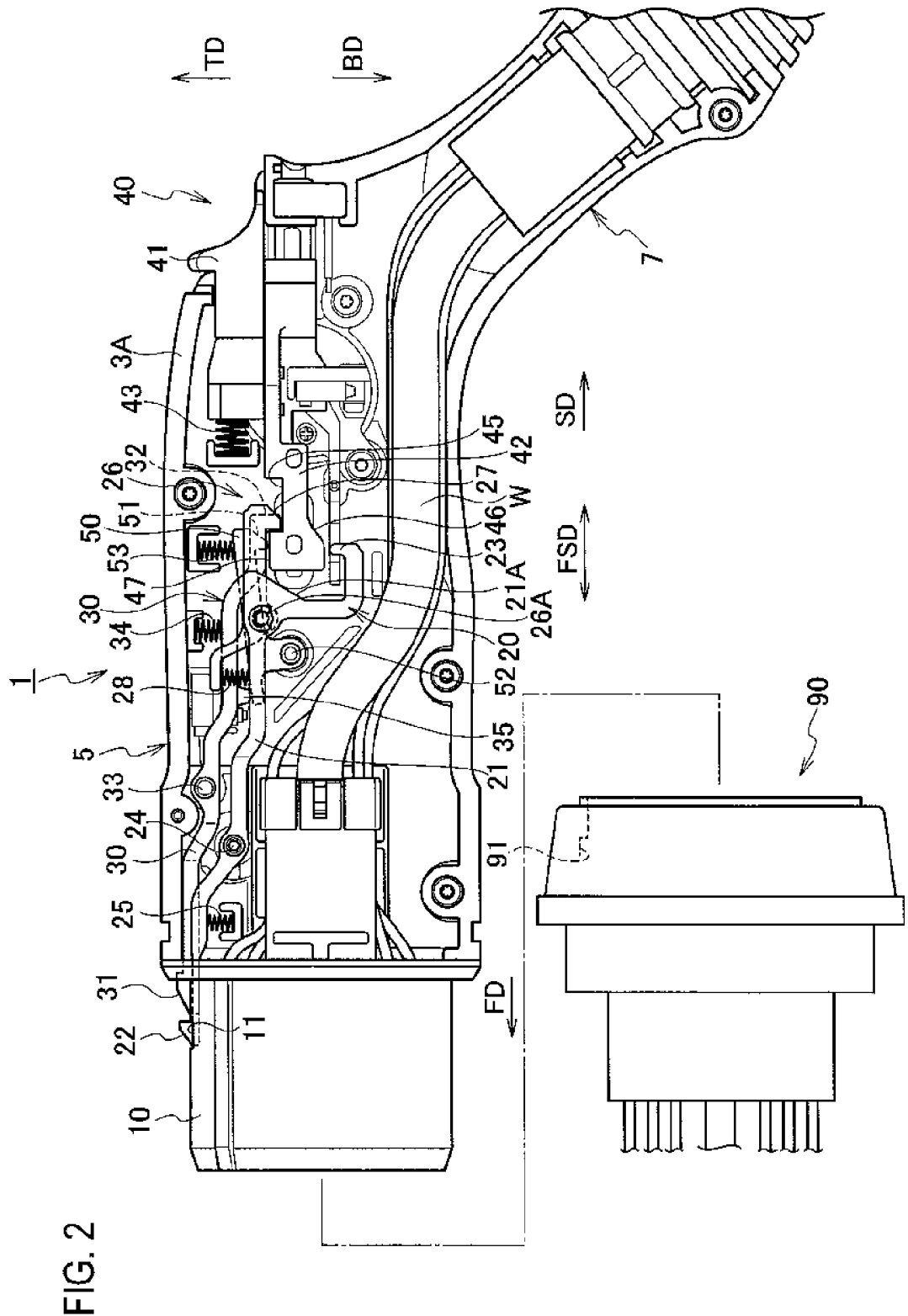
FIG. 2 is a longitudinal cross-sectional view illustrating the charging connector according to the embodiment of the present invention.
Figure 3:
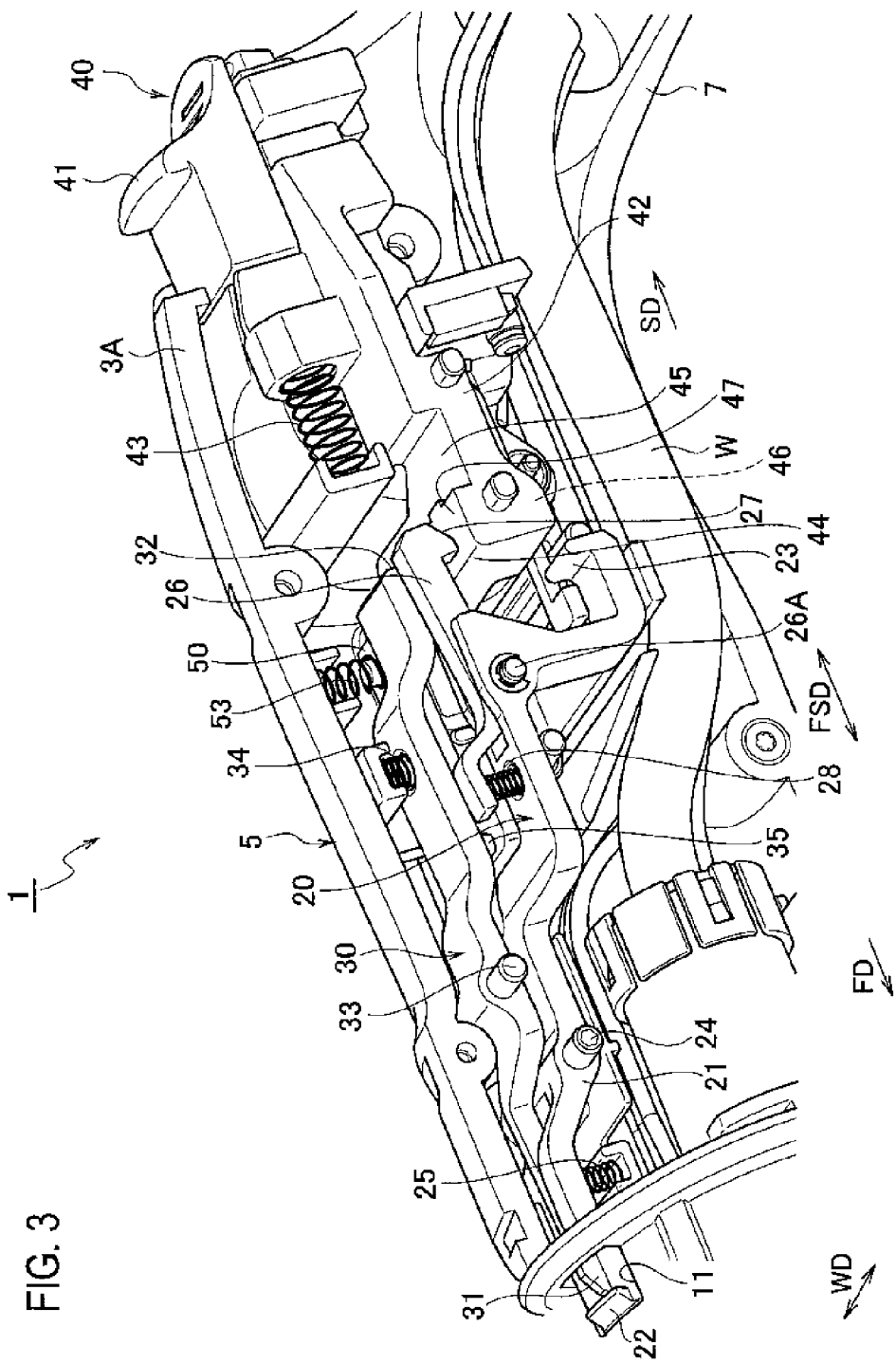
FIG. 3 is a perspective view illustrating an inside of the charging connector according to the embodiment of the present invention.
Figure 4:
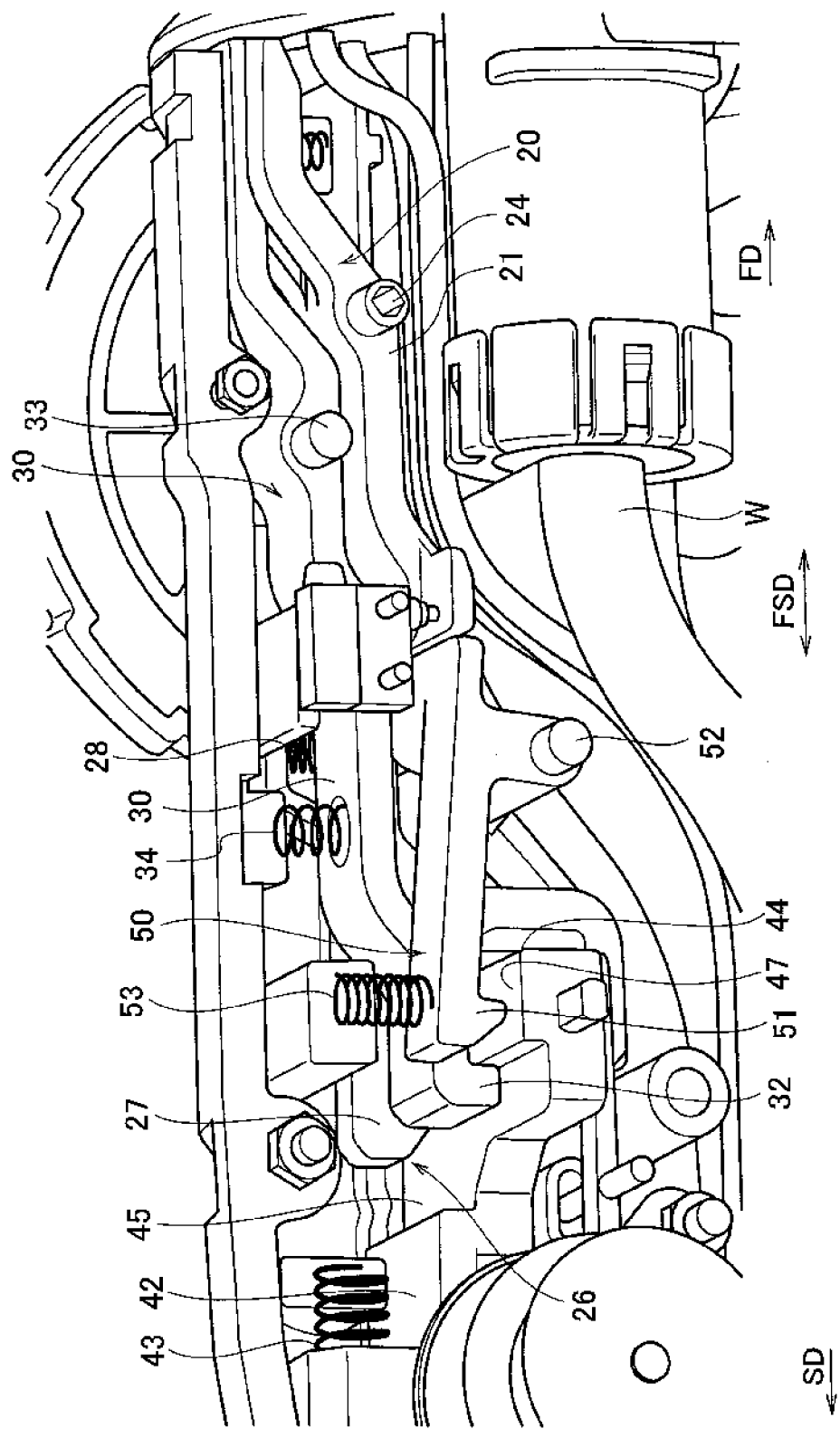
FIG. 4 is a perspective view illustrating the inside of the charging connector according to the embodiment of the present invention.

The lock arm 20 blocks the charging connector 1 from being separated from the vehicle-side inlet 90 in a state where the vehicle-side inlet 90 is fitted with the connector fitting portion 10. As illustrated in FIGS. 2 to 4, the lock arm 20 includes a locking main arm 21 swingably provided in the case main body portion 5 and a locking auxiliary arm 26 swinging with the locking main arm 21.

The locking main arm 21, as illustrated in FIGS. 1 to 3, includes a locking claw 22 that is provided at a tip end side of the locking main arm 21 and can protrude from the notch 11 of the connector fitting portion 10, and a locking engagement piece 23 that is provided at a backend of the locking main arm 21 and serves as the engagement portion latching in a lower-side locking groove portion 46 described below of the release lever 40.

The locking main arm 21 is swingably provided about an axis core 24 between the locking position where the locking claw 22 is locked in a locking groove portion 91 (refer to FIG. 2) provided on the inner circumferential surface of the vehicle-side inlet 90, and the non-locking position where locking between the locking claw 22 and the locking groove portion 91 is released. The locking main arm 21 is urged toward a direction (upward direction TD) in which the locking claw 22 protrudes from the notch 11 of the connector fitting portion 10 by the coil spring 25.

The locking main arm 21 is bent toward a downward direction BD close to the release lever 40. The locking main arm 21 extends from a bent lower end along the separation direction SD, and a locking engagement piece 23 is provided at the tip end of the locking main arm 21.

The locking engagement piece 23 engages with the lower-side locking groove portion 46 described below of the release lever 40 at the non-locking position of the locking main arm 21 (i.e., in a state where the locking claw 22 is saved in the notch 11). On the other hand, engagement between the locking engagement piece 23 and the upper-side locking groove portion 45 described below of the release lever 40 is released at the locking position of the locking main arm 21 (i.e., in a state where the locking claw 22 protrudes from the notch 11).

The locking auxiliary arm 26, as illustrated in FIGS. 2 and 3, includes an auxiliary locking piece 27 that is provided at a backend of the locking auxiliary arm 26, and serves as the second locking portion locked in an upper-side locking groove portion 45 described below of the release lever 40.

The locking auxiliary arm 26 is swingably provided about the axis core 26A between the locking position where the auxiliary locking piece 27 is locked in the upper-side locking groove portion 45 described below of the release lever 40, and the non-locking position (release position) where locking between the auxiliary locking piece 27 and the upper-side locking groove portion 45 is released. The locking auxiliary arm 26 is urged in a locking direction (downward direction BD) of the auxiliary locking piece 27 by the coil spring 28 serving as a second urging unit.

The auxiliary locking piece 27 extends toward the downward direction BD, and is provided capable of being locked in the upper-side locking groove portion 45 described below of the release lever 40. The auxiliary locking piece 27 is provided at a position facing the locking engagement piece 23 described above. The auxiliary locking piece 27 is provided closer to the separation direction SD side than a detection locking piece 32 described below of the fitting detection arm 30 and the holding locking piece 51 described below of the lever holding arm 50.

The auxiliary locking piece 27 is released from locking with the upper-side locking groove portion 45 described below of the release lever 40 at the non-locking position of the locking main arm 21 (i.e., in a state where the locking claw 22 is saved in the notch 11). On the other hand, the auxiliary locking piece 27 can be locked with the upper-side locking groove portion 45 described below of the release lever 40 at the locking position with the locking main arm 21 (i.e., in a state where the locking claw 22 protrudes from the notch 11).

Fitting Detection Arm

A fitting detection arm 30 detects a completely fitted state between the vehicle-side inlet 90 and the connector fitting portion 10. The fitting detection arm 30, as illustrated in FIGS. 2 to 4, includes a detection claw 31 that is provided at a tip end side of the fitting detection arm 30 and is capable of protruding from the notch 11 of the connector fitting portion 10, and the detection locking piece 32 that is provided at a backend side of the fitting detection arm 30 and locked in the upper-side locking groove portion 45 described below of the release lever 40.

The fitting detection arm 30 is swingably provided about an axis core 33 between a fitting position where the detection claw 31 comes into contact with the tip end surface of the vehicle-side inlet 90 to detect fitting of the connector fitting portion 10 into the vehicle-side inlet 90, and the separation position where contact between the detection claw 31 and the vehicle-side inlet 90 is released to detect separation of the connector fitting portion 10 from the vehicle-side inlet 90. The fitting detection arm 30 is urged by the coil spring 34 toward a direction in which the detection claw 31 protrudes to the notch 11 of the connector fitting portion 10 (i.e., locking direction of the detection locking piece 32).

The detection claw 31 is provided capable of going outside and coming back from the notch 11 of the connector fitting portion 10 (capable of forwarding or withdrawing). The detection claw 31 is provided closer to the separation direction SD side than the locking claw 22 of the locking main arm 21 described above.

The detection locking piece 32 extends toward the downward direction BD, and is provided capable of being locked in the upper-side locking groove portion 45 described below of the release lever 40. The detection locking piece 32 is provided closer to a fitting direction FD side than the auxiliary locking piece 27 of the locking auxiliary arm 26, and is provided closer to the separation direction SD side than the holding locking piece 51 described below of the lever holding arm 50.

The detection locking piece 32 is released from locking in the upper-side locking groove portion 45 described below of the release lever 40 at the fitting position of the connector fitting portion 10 (i.e., in a state where the detection claw 31 is saved in the notch 11 of the connector fitting portion 10). On the other hand, the detection locking piece 32 is locked in the upper-side locking groove portion 45 described below of the release lever 40 at the separation position of the connector fitting portion 10 (i.e., in a state the detection claw 31 protrudes from the notch 11 of the connector fitting portion 10).

Between the detection locking piece 32 and the axis core 33, a protrusion 35 (refer to FIGS. 2 and 3) protruding toward the downward direction BD is provided. The protrusion 35 releases locking between the upper-side locking groove portion 45 described below of the release lever 40 and the holding locking piece 51 described below of the lever holding arm 50 by pressing the tip end side of the lever holding arm 50 (closer to the tip end side than the axis core 52 described below) toward the downward direction BD.

Release Lever

The release lever 40 slides to move toward the fitting direction FD and the separation direction SD to release locking between the locking groove portion 91 inside the vehicle-side inlet 90 and the locking claw 22. The release lever 40 moves from the start position to the completion position of the push-in operation.

The release lever 40, as illustrated in FIGS. 2 and 3, includes a release switch 41 whose backend protrudes from the case main body portion 5 and that moves in a fitting and separation direction FSD, and a release main body portion 42 provided in the case main body portion 5 and integrally formed with the release switch 41.

The release switch 41 is urged to the start position of the push-in operation (i.e., at the separation direction SD side) by the coil spring 43. The release main body portion 42 includes a tip-end abutment portion 44 that abuts on and pushes up the auxiliary locking piece 27 of the locking auxiliary arm 26, the detection locking piece 32 of the fitting detection arm 30, and the holding locking piece 51 described below of the lever holding arm 50 when the push-in operation of the release switch 41 is performed.

The tip-end abutment portion 44 abuts on the inclined surface 21A of the locking main arm 21 at the completion position of the push-in operation of the release switch 41 to swing the locking main arm 21 to the non-locking position. The tip-end abutment portion 44 is formed in a curved shape.

At the tip end upper side of the release main body portion 42, the upper-side locking groove portion 45 is provided in which the auxiliary locking piece 27 of the locking auxiliary arm 26 and the detection locking piece 32 of the fitting detection arm 30 are locked. On the other hand, at the tip end lower side of the release main body portion 42, the lower-side locking groove portion 46 in which the locking engagement piece 23 of the locking main arm 21 is locked is provided.

Figure 5:
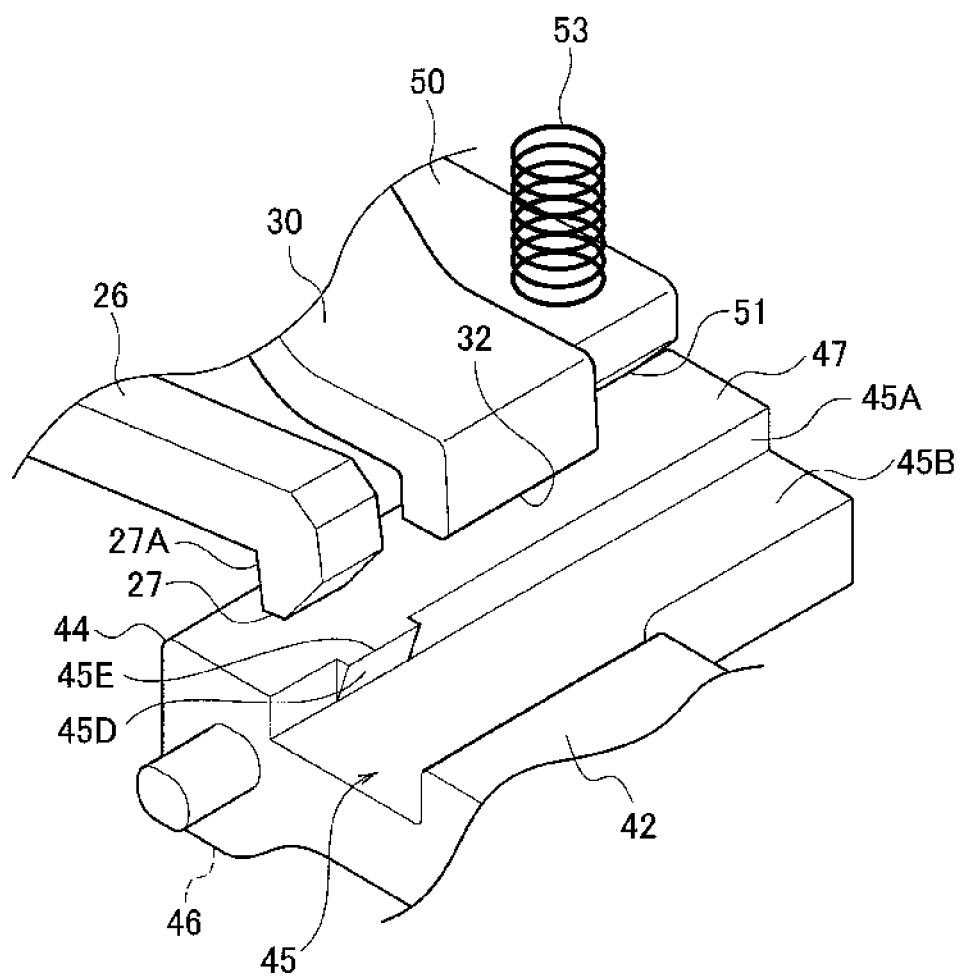
FIG. 5 is a perspective view illustrating the inside of the charging connector according to the embodiment of the present invention.

More specifically, as illustrated in FIG. 5, the upper-side locking groove portion 45 includes a locking surface 45A falling from a plane surface 47 along a movement direction of the release main body portion 42 and a bottom surface 45B along a back direction from the lower end of the locking surface 45A. The upper-side locking groove portion 45 is set to have a depth in which each tip end of the auxiliary locking piece 27, the detection locking piece 32, and the holding locking piece 51 described below do not come into contact with the bottom surface 45B (refer to FIG. 11C).

On the locking surface 45A, the auxiliary locking piece 27, the detection locking piece 32, and the holding locking piece 51 described below are locked. At one part of the locking surface 45A (part corresponding to the auxiliary locking piece 27), an inclined surface 45D having an "α" angle of less than 90 degrees with respect to the plane surface 47 is provided.

The top point 45E between the plane surface 47 and the inclined surface 45D is configured to come into contact with an inner wall 27A of the auxiliary locking piece 27 in the movement process of the release lever 40 from the start position to the completion position. In other words, the inner wall 27A of the auxiliary locking piece 27 is configured to slide over the top point 45E (so called an "edge") between the plane surface 47 and the inclined surface 45D, and a surface of the inner wall 27A of the auxiliary locking piece 27 is configured not to come into contact with the locking surface 45A in the movement process of the release lever 40 from the start position to the completion position.

Lever Holding Arm

The lever holding arm 50 holds the release lever 40 at the completion position of the release lever 40. The lever holding arm 50 includes, as illustrated in FIGS. 2 to 4, the holding locking piece 51 that is provided at a backend side of the lever holding arm 50 and serves as the first locking portion locking in the upper-side locking groove portion 45 of the release lever 40 at a pressing position of the release lever 40.

The lever holding arm 50 is swingably provided about the axis core 52 between a lever holding position where the release lever 40 is held at the completion position (i.e., a state where the holding locking piece 51 is locked in the upper-side locking groove portion 45), and a lever non-holding position where the release lever 40 is not held (i.e., a state where locking between the holding locking piece 51 and the upper-side locking groove portion 45 is released).

At the holding locking piece 51 side from the axis core 33 of the lever holding arm 50, the coil spring 53 serving as the first locking portion is provided to urge the holding locking piece 51 side to forward in the downward direction BD by the coil spring 28. At the tip end side from the axis core 33 of the lever holding arm 50, the fitting detection arm 30 can abut on the protrusion 35.

The holding locking piece 51 extends toward the downward direction BD, and is provided capable of being locked in the upper-side locking groove portion 45 of the release lever 40. The holding locking piece 51 is provided closer to the fitting direction FD side than the auxiliary locking piece 27 of the locking auxiliary arm 26 and the detection locking piece 32 of the fitting detection arm 30.

The holding locking piece 51 is locked in the upper-side locking groove portion 45 of the release lever 40 at the lever holding position. On the other hand, at the lever non-holding position, the holding locking piece 51 at the tip end side from the axis core 33 of the lever holding arm 50 is pressed by the protrusion 35 so that the locking between the upper-side locking groove portion 45 of the release lever 40 and the holding locking piece 51 is released.

Action of Charging Connector

Subsequently, with reference to the figures, actions of the above-described charging connector 1 will be described. FIGS. 6 to 13 illustrate actions of the charging connector 1 according to the present embodiment.

Insertion Operation

Figure 6:
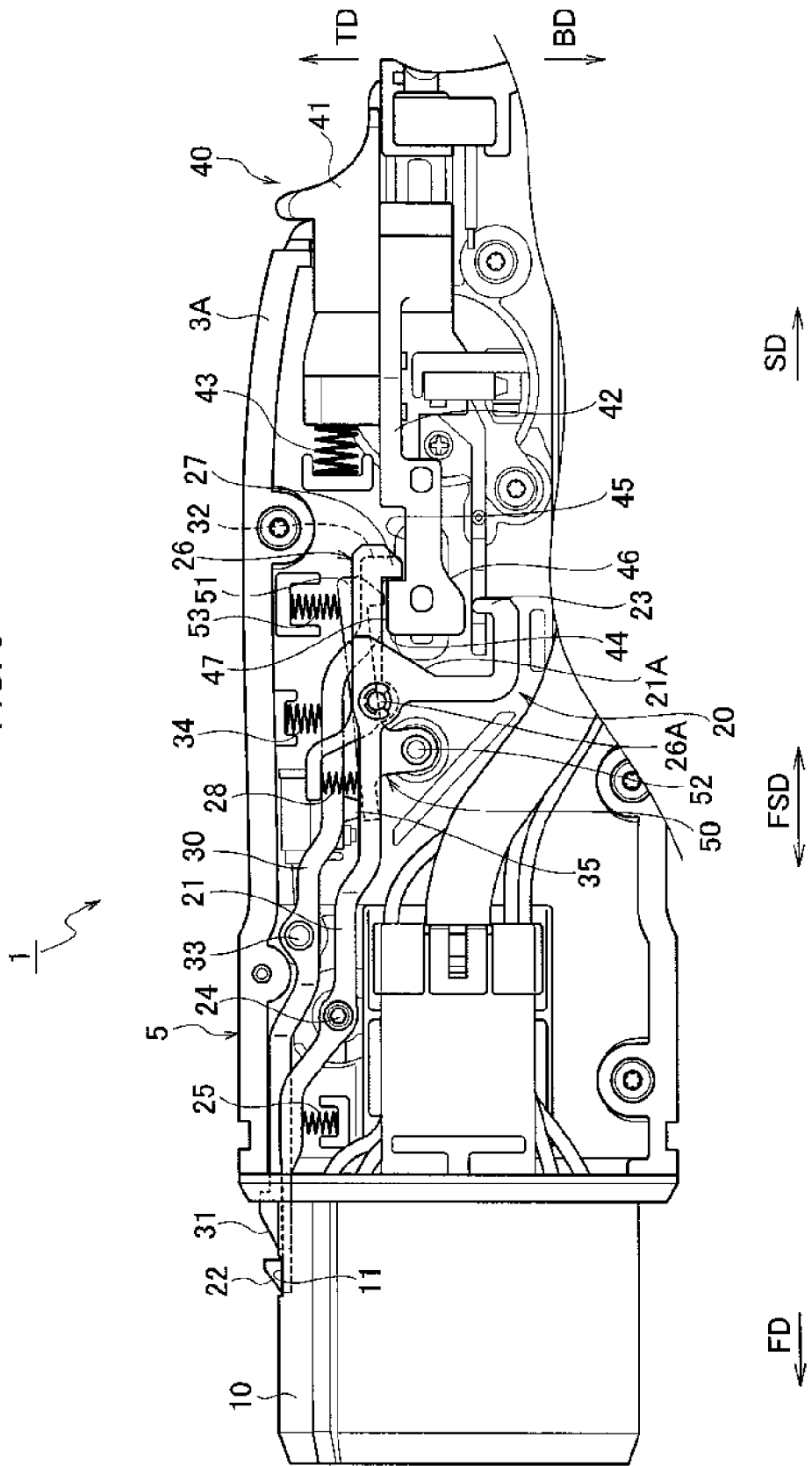
FIG. 6 illustrates an action (before an inserting operation) of the charging connector according to the embodiment of the present invention.

As illustrated in FIG. 6, in the separation state of the charging connector 1 from the vehicle-side inlet 90, the locking claw 22 of the locking main arm 21 and the detection claw 31 of the fitting detection arm 30 protrude from the notch 11 of the connector fitting portion 10.

At this point, the detection locking piece 32 of the fitting detection arm 30 is locked in the upper-side locking groove portion 45 of the release lever 40. Further, since the auxiliary locking piece 27 is located closer to the separation direction SD side than the detection locking piece 32, the auxiliary locking piece 27 is ready for being instantly locked when locking between the detection locking piece 32 and the upper-side locking groove portion 45 is released in a state where the auxiliary locking piece 27 is not completely locked in the upper-side locking groove portion 45.

Figure 7:
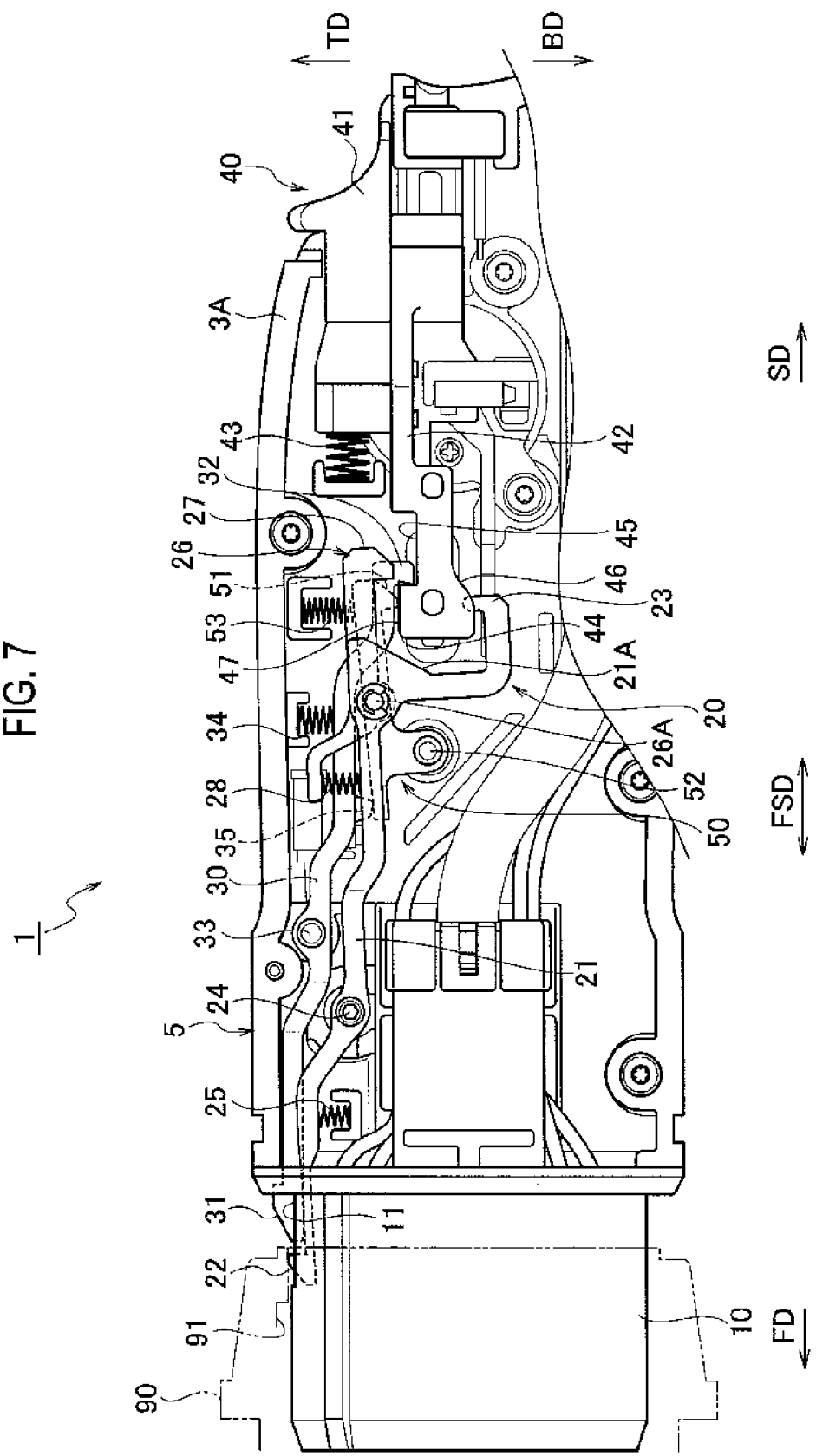
FIG. 7 illustrates an action (in a middle of the inserting operation) of the charging connector according to the embodiment of the present invention.

Subsequently, as illustrated in FIG. 7, if the charging connector 1 is gradually fitted into the vehicle-side inlet 90, the charging connector 1 abuts on the inner circumferential surface of the vehicle-side inlet 90 so that the locking claw 22 is saved in the notch 11 of the connector fitting portion 10 (pushed in). Then, the locking main arm 21 swings to remove the auxiliary locking piece 27 from the upper-side locking groove portion 45. At this point, the locking engagement piece 23 of the locking main arm 21 is inserted into the lower-side locking groove portion 46.

Figure 8:
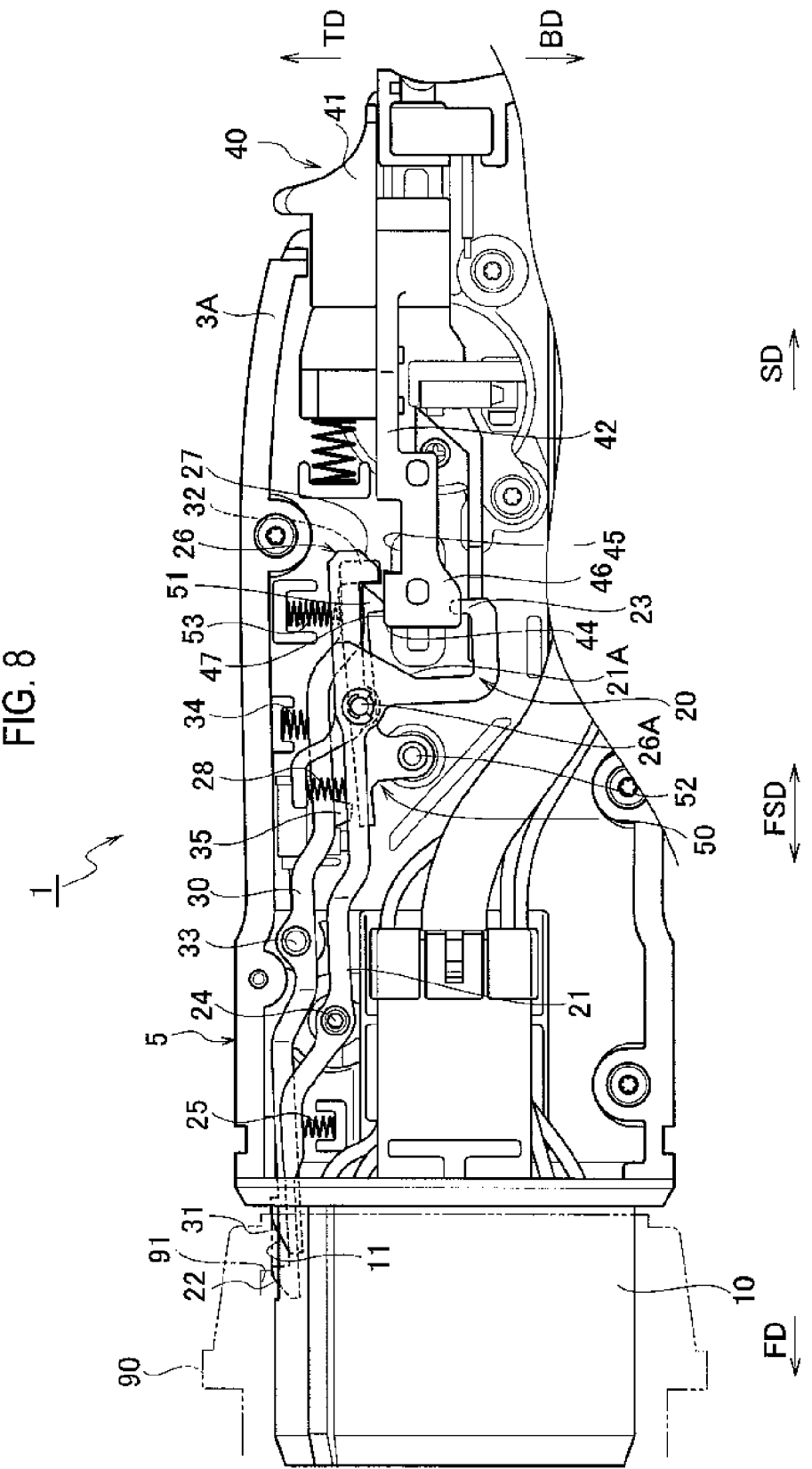
FIG. 8 illustrates the action (in the middle of the inserting operation) of the charging connector according to the embodiment of the present invention.

Subsequently, as illustrated in FIG. 8, if the charging connector 1 is further fitted into the vehicle-side inlet 90, the charging connector 1 abuts on the tip end surface of the vehicle-side inlet 90 so that the detection claw 31 is saved in the notch 11 of the connector fitting portion 10 (pushed in). Then, the fitting detection arm 30 swings to remove the detection locking piece 32 from the upper-side locking groove portion 45. At this point, since the locking engagement piece 23 is inserted into the lower-side locking groove portion 46 of the release main body portion 42, the release lever 40 is still blocked from moving to the separation direction SD side (start position side of the push-in operation).

Figure 9:
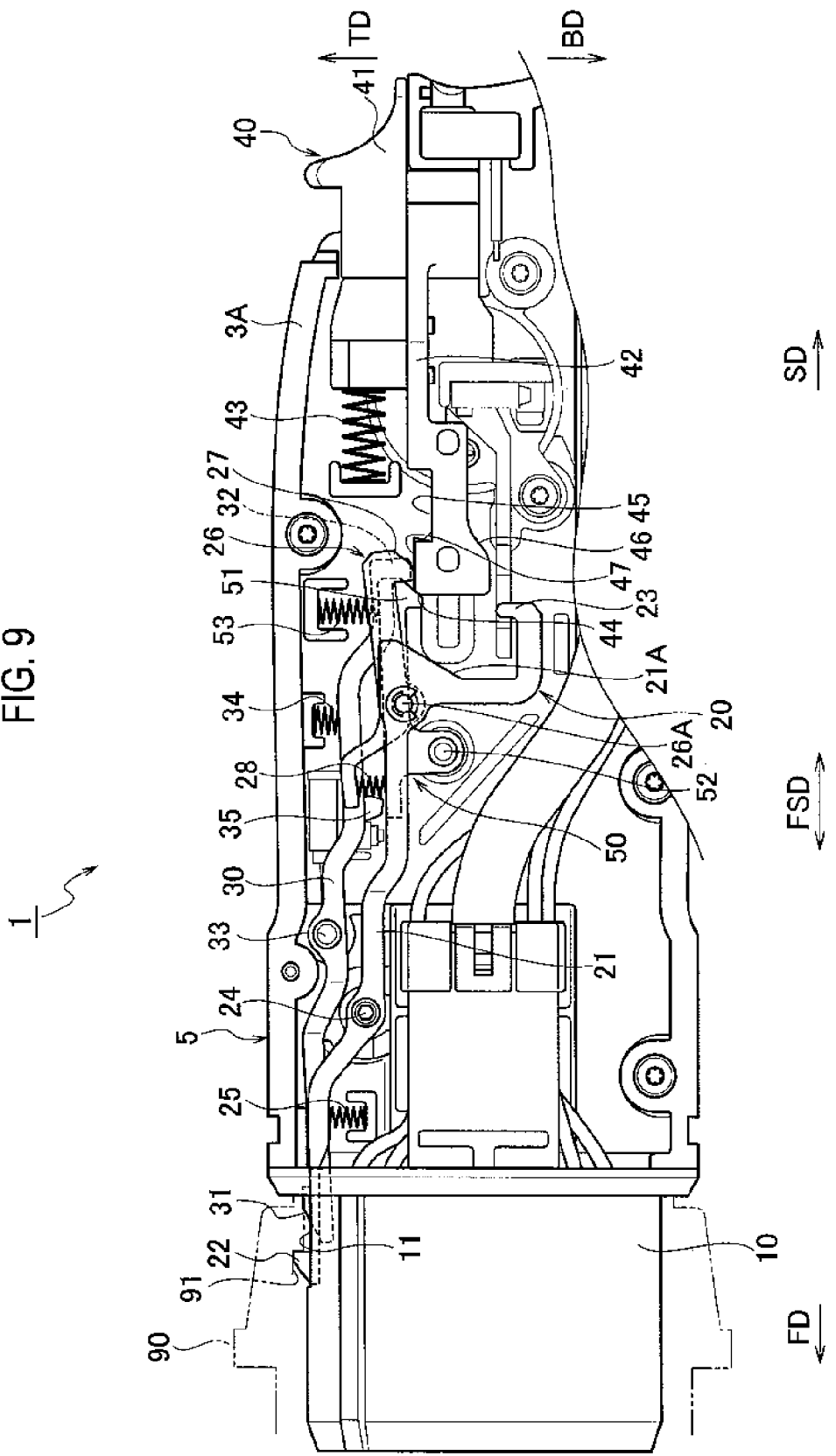
FIG. 9 illustrates an action (completely fitted) of the charging connector according to the embodiment of the present invention.

Subsequently, as illustrated in FIG. 9, if the charging connector 1 is completely fitted into the vehicle-side inlet 90, the locking main arm 21 swings, and the locking claw 22 protrudes from the notch 11 of the connector fitting portion 10 to locate the locking main arm 21 to a locking position. Then, the locking claw 22 is locked in the locking groove portion 91 of the vehicle-side inlet 90. Further, since the locking engagement piece 23 is removed from the lower-side locking groove portion 46, the release lever 40 moves to the separation direction SD side (start position side of the push-in operation).

Pulling-Out Operation

As illustrated in FIGS. 10 and 11, when the charging to the battery (not shown) to be mounted to the vehicle is finished and a charging connector 100 is removed from the vehicle-side inlet 90, the push-in operation (pressing to the fitting direction FD side) is performed on the release switch 41 of the release lever 40.

Figure 10A:
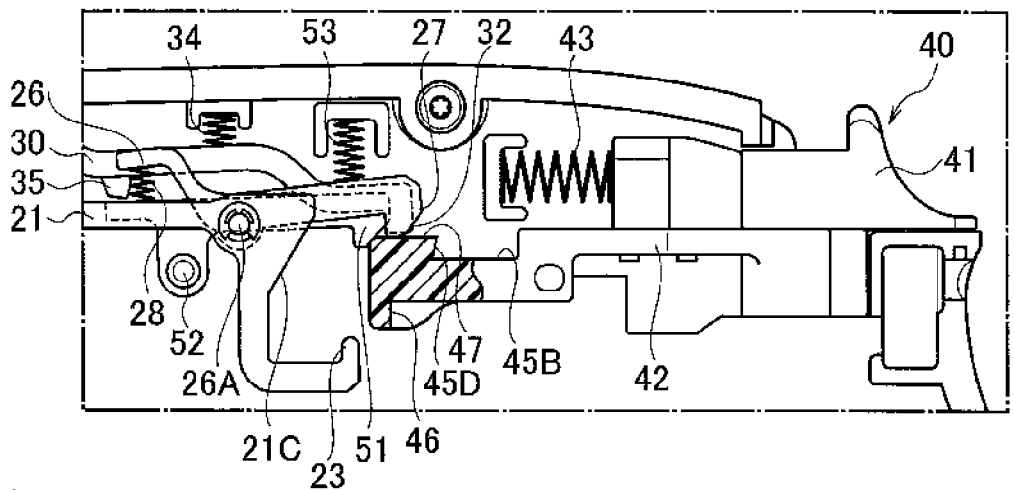
FIG. 10A to FIG. 10C illustrate actions (starting a pulling operation) of the charging connector according to the embodiment of the present invention.
Figure 10B:
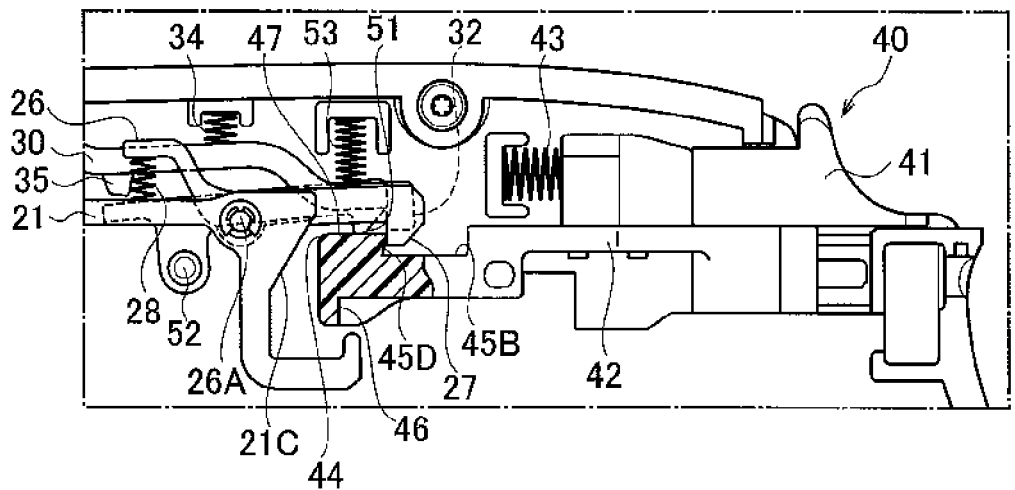
Figure 10C:
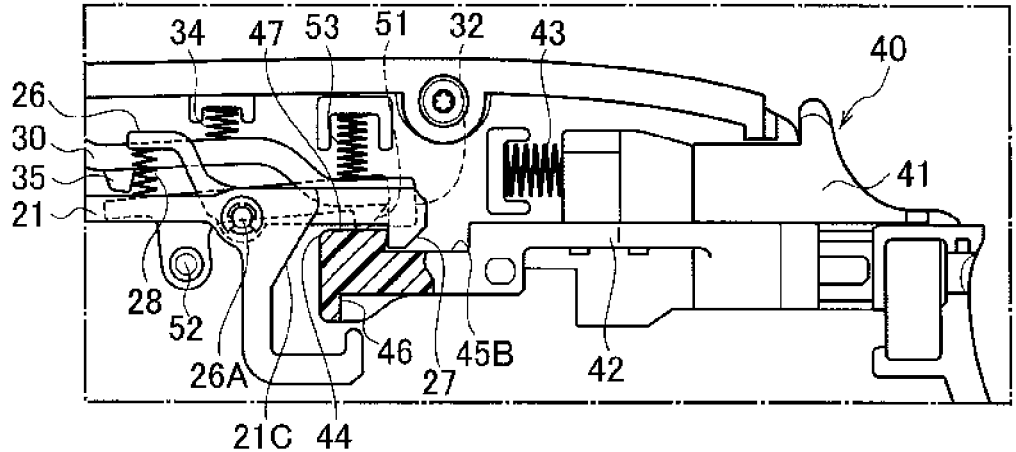
Figure 12:
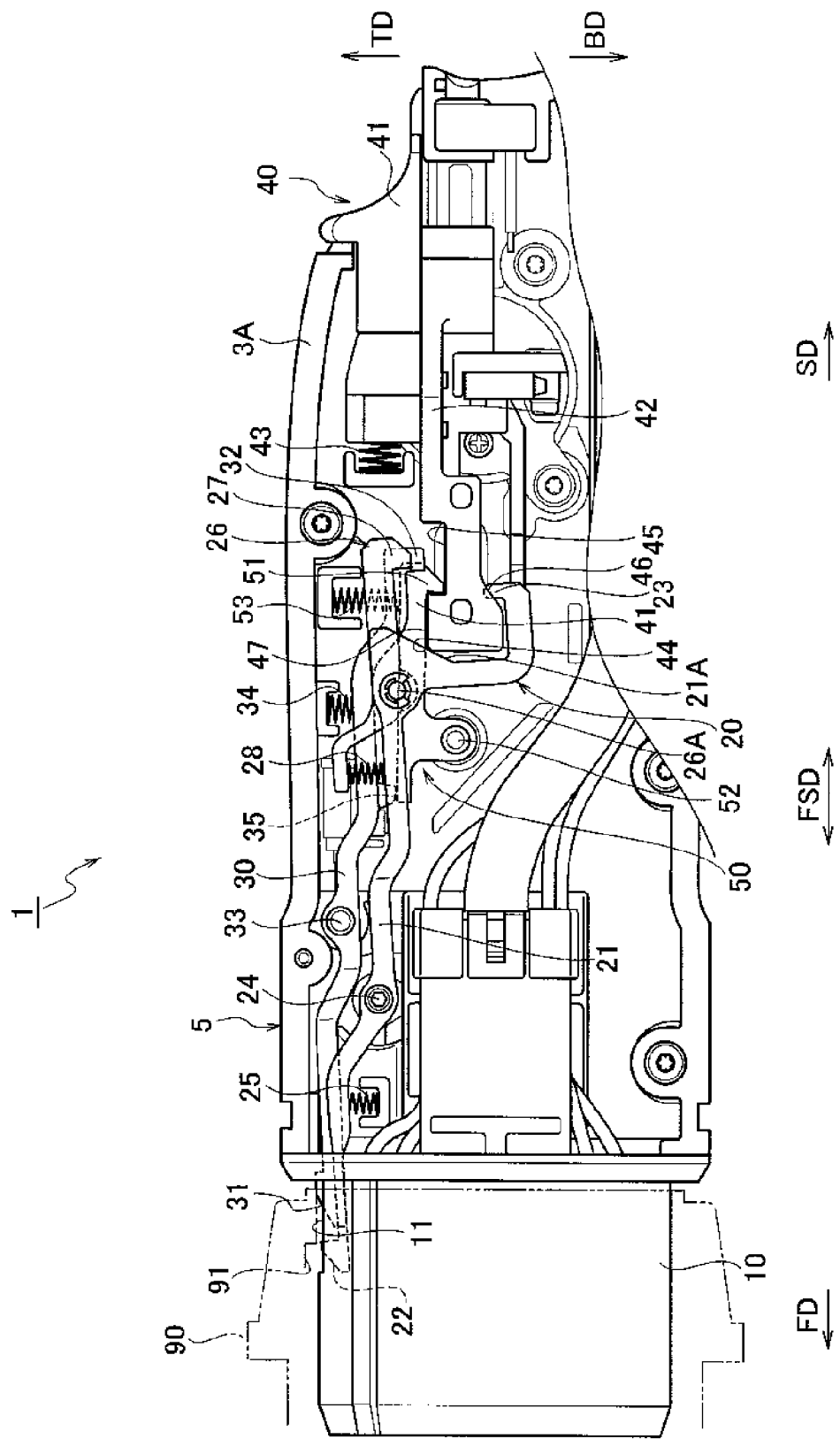
FIG. 12 illustrates an action (in a middle of the pulling operation) of the charging connector according to the embodiment of the present invention.

At this point, the release lever 40 passes through the movement process illustrated in FIGS. 10B and 10C from the start position of the push-in operation illustrated in FIG. 10A to the completion position of the push-in operation illustrated in FIG. 12.

Figure 11A:
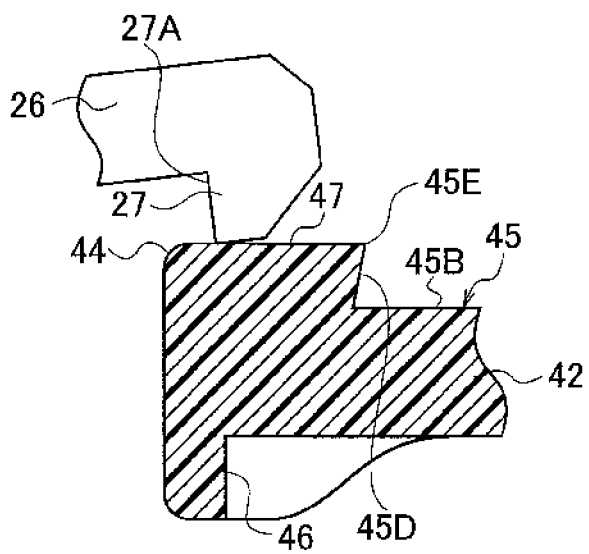
FIG. 11A to FIG. 11C illustrate actions (starting the pulling operation) of the charging connector according to the embodiment of the present invention.

Herein, as illustrated in FIGS. 10A and 11A, at the start position of the push-in operation of the release lever 40, the auxiliary locking piece 27 of the locking auxiliary arm 26, the detection locking piece 32 of the fitting detection arm 30, and the holding locking piece 51 of the lever holding arm 50 are held up by the tip-end abutment portion 44 of the release main body portion 42.

Figure 11B:
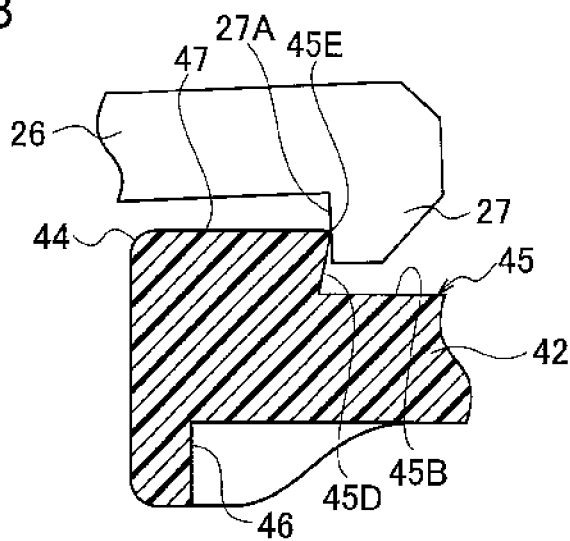
Figure 11C:
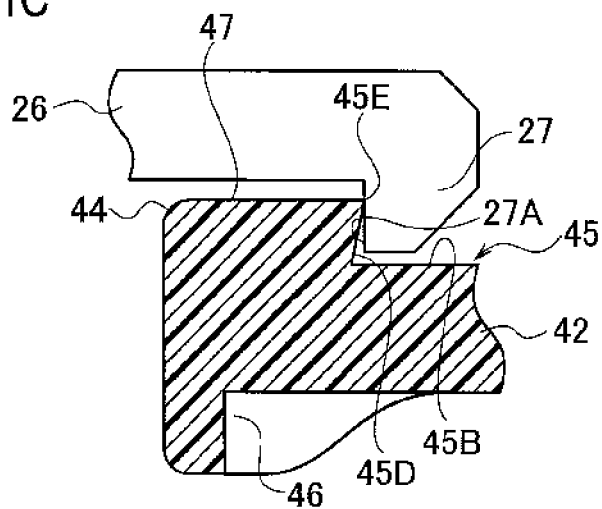

First, in the movement process of the release lever 40 from the start position to the completion position (i.e., right before the completion position), when the release main body portion 42 moves toward the fitting direction FD, the auxiliary locking piece 27 and the holding locking piece 51 move toward the separation direction SD on the plane surface 47 with an urging force of the coil spring 28 as illustrated in FIGS. 10A and 11A. Then, as illustrated in FIGS. 10B and 11B, the auxiliary locking piece 27 located closer to the separation direction SD side than the holding locking piece 51 slides over the top point 45E between the plane surface 47 and the inclined surface 45D (in contact with only the top point 45E), and falls in the upper-side locking groove portion 45 as illustrated in FIGS. 10C and 11C. At this point, the tip end of the auxiliary locking piece 27 does not come into contact with the bottom surface 45B of the upper-side locking groove portion 45. The locking main arm 21 is still located at the locking position.

Further, as illustrated in FIG. 12, at the completion position of the release lever 40 that has moved toward the fitting direction FD, the tip-end abutment portion 44 of the release main body portion 42 abuts on the inclined surface 21A of the locking main arm 21 to swing the locking main arm 21. Then, the locking claw 22 is pushed into the notch 11 of the connector fitting portion 10 to locate the locking main arm 21 at the non-locking position.

The auxiliary locking piece 27 of the locking auxiliary arm 26 is pushed up from the upper-side locking groove portion 45 accordingly, and the locking engagement piece 23 is inserted into the lower-side locking groove portion 46. In addition, the holding locking piece 51 of the lever holding arm 50 falls from the plane surface 47 to the upper-side locking groove portion 45 with the urging force of the coil spring 53 to be locked on the locking surface 45A. At this point, the tip end of the holding locking piece 51 does not come into contact with the bottom surface 45B of the upper-side locking groove portion 45. The release lever 40 is held at the completion position of the push-in operation, and the release lever 40 is blocked from moving to the start position side of the push-in operation.

Figure 13:
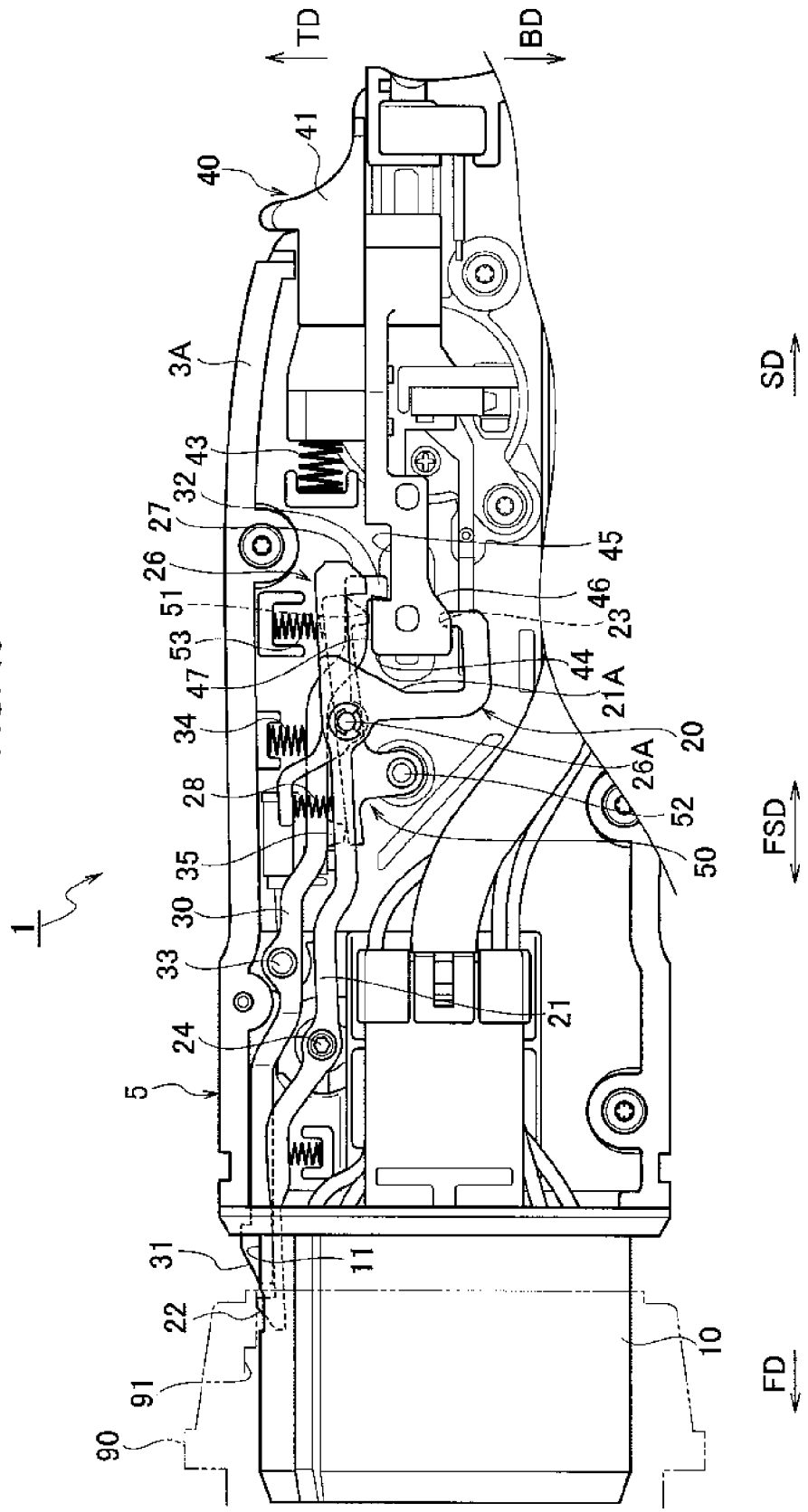
FIG. 13 illustrates the action (in the middle of the pulling operation) of the charging connector according to the embodiment of the present invention.
Figure 14:
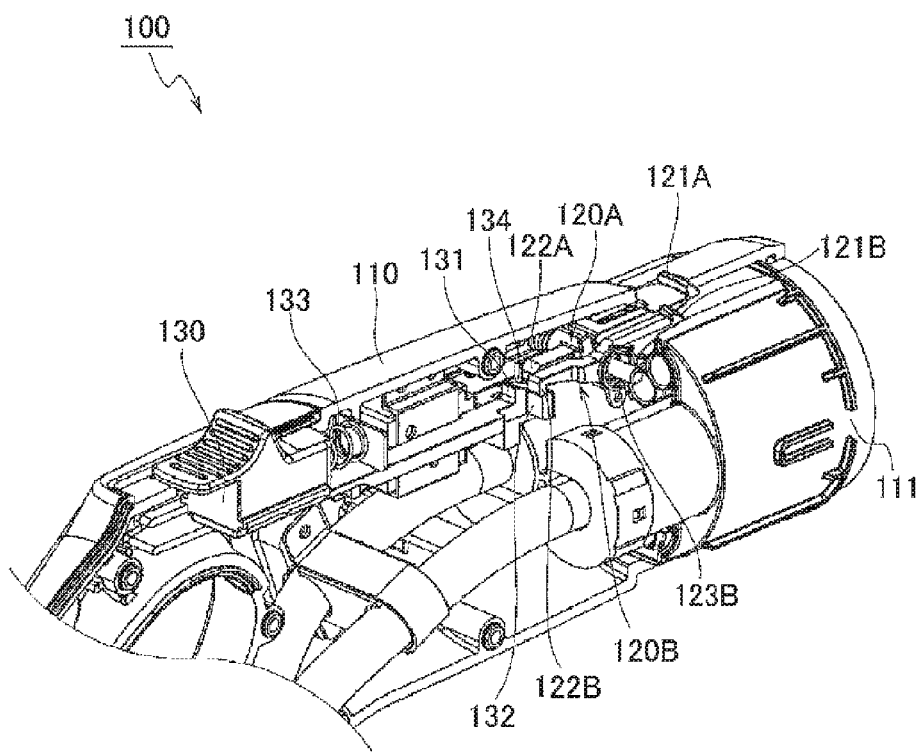
FIG. 14 is a perspective view illustrating the inside of a charging connector according to background art.

Subsequently, as illustrated in FIG. 13, if the charging connector 100 is gradually separated away from the vehicle-side inlet 90, the fitting detection arm 30 swings, and the detection claw 31 protrudes from the notch 11 of the connector fitting portion 10. Then, the detection locking piece 32 is locked in the upper-side locking groove portion 45. At this point, the protrusion 35 provided at a back surface side of the fitting detection arm 30 swings the lever holding arm 50, and the holding locking piece 51 is removed from the upper-side locking groove portion 45.

The charging connector 100 completely separates away from the vehicle-side inlet 90 to return to the state described above right before an insertion operation of the charging connector 100 has been performed (refer to FIG. 6).

Operation, Effects

According to the present embodiment described above, in the movement process of the release lever 40 from the start position to the completion position, since the auxiliary locking piece 27 comes into contact with only the top point 45E between the plane surface 47 and the inclined surface 45D of the release lever 40, the surface of the inner wall 27A of the auxiliary locking piece 27 does not come into contact with the locking surface 45A. Therefore, the interference sound of the auxiliary locking piece 27 against the locking surface 45A can be reduced. On the other hand, at the completion position of the release lever 40, the holding locking piece 51 falls from the plane surface 47 of the release lever 40 into the upper-side locking groove portion 45 to be locked on the locking surface 45A, and the surface of the inner wall of the holding locking piece 51 comes into contact with the locking surface 45A. Therefore, the interference sound of the holding locking piece 51 against the locking surface 45A is generated so that the operator can determine that the release lever 40 has moved up to the completion position. As described above, the interference sound of the auxiliary locking piece 27 first locked on the locking surface 45A of the release lever 40 can be reduced to prevent the push-in operation of the release lever 40 from being stopped. Therefore, the problem (e.g., damage of the locking claw 22) caused by forcibly pulling out the connector fitting portion 10 from the vehicle-side inlet 90 can be prevented.

According to the present embodiment, at the non-locking position of the locking main arm 21, the auxiliary locking piece 27 of the locking auxiliary arm 26 is pushed up from the upper-side locking groove portion 45 so that the locking engagement piece 23 is inserted into the lower-side locking groove portion 46. At this point, the holding locking piece 51 is locked on the locking surface 45A. With this arrangement, even if the holding locking piece 51 is released to be locked on the locking surface 45A by some causes (e.g., damage of the holding locking piece 51), it can be realized that the locking engagement piece 23 is instantly locked in the lower-side locking groove portion 46 (i.e., double latch).

According to the present embodiment, the release main body portion 42 of the release lever 40 includes the curved tip-end abutment portion 44 and thus, when the push-in operation of the release switch 41 is performed, the interference sound generated against each member can be further reduced, for example, when the curved tip-end abutment portion 44 abuts on and pushes up the auxiliary locking piece 27, the detection locking piece 32, and the holding locking piece 51, or when it abuts on the inclined surface 21A of the locking main arm 21 to swing the locking main arm 21.

According to the present embodiment, the auxiliary locking piece 27 is arranged closer to the separation direction SD side than the holding locking piece 51, and the inclined surface 45D is provided only in a region that is in contact with the auxiliary locking piece 27 of the locking surface 45A. Therefore, only by processing a part of the upper-side locking groove portion 45 of the release lever 40, the interference sound of the auxiliary locking piece 27 for first locking on the locking surface 45A of the release lever 40 can be reduced.

Other Embodiment

As described above, the contents of the present invention have been disclosed via the embodiment of the present embodiment, but it should not be understood that the descriptions and the figures configuring a part of the disclosure limit the present invention. The disclosure clarifies various types of alternative forms, embodiments, and application techniques for those skilled in the art.

For example, the embodiment of the present invention can be changed as below. More specifically, the charging connector 1 has been described as being used for supplying the power to the battery of the vehicle, but the charging connector 1 should not be limited thereto. It can be also applied to inlets of charging devices mounted to ships, submarines, and airplanes when they move, and also inlets of charging devices provided in houses, buildings, and factories.

Further, the inclined surface 45D has been described as being to be provided on a part of the locking surface 45A (point corresponding to the auxiliary locking piece 27), but the inclined surface 45D is not limited thereto. It may be also provided at a point corresponding to the detection locking piece 32.

Furthermore, the inclined surface 45D has been described as being provided on the upper-side locking groove portion 45, but it is not limited thereto. For example, the inclined surface 45D may be provided at the auxiliary locking piece 27 side. In other words, the inclined surface 45D is provided at least one of the auxiliary locking piece 27 and the inclined surfaces 45D of the upper-side locking groove portion 45, and it may also be provided at both. The inclined surface 45D does not always need to be in a straight line shape, but may be in a curved line shape.

Moreover, the tip-end abutment portion 44 has been described as being formed in a curved shape, but it is not limited thereto. The tip-end abutment portion 44 may be formed in other shape (e.g., inclined surface).

As described above, the present invention, of course, includes various types of embodiments that are not described herein. Therefore, the technical scope of the present invention can be defined only by specific items of the invention according to the appropriate scope of the claims of the invention based on the above-described descriptions.

What is claimed is:

1. A charging connector comprising:
   a release lever configured to move between a start position and a completion position of a push-in operation and be urged to a side of the start position, and having a locking groove portion including a locking surface that falls from a plane surface along a movement direction and a bottom surface;
   a lever holding arm swingably provided between a lever holding position where the release lever is held at the completion position and a lever non-holding position, and configured to be urged by a first urging unit in a locking direction of a first locking portion locked on the locking surface; and
   a locking auxiliary arm swingably provided between a locking position and a non-locking position on the locking surface, and configured to be urged by a second urging unit in a locking direction of a second locking portion locked on the locking surface,
   wherein the locking groove portion is set to have a depth in which each tip end of the first locking portion and the second locking portion and the bottom surface do not come into contact with each other;
   wherein at least one of the locking surface and the second locking portion includes an inclined surface having an angle of less than 90 degrees with respect to the plane surface;
   wherein, in a movement process of the release lever from the start position to the completion position, the first locking portion moves on the plane surface with an urging force of the first urging unit, and also the second locking portion slides over a top point between the plane surface and the inclined surface with an urging force of the second urging unit; and
   wherein, at the completion position of the release lever, the first locking portion falls from the plane surface to the locking groove portion with the urging force of the first urging unit to be locked on the locking surface, and the tip end of the first locking portion does not come into contact with the bottom surface.

2. The charging connector according to claim 1,
   wherein the locking auxiliary arm constitutes a lock arm together with a lock main arm;
   wherein the lock main arm is swingably provided between a locking position and a non-locking position with a vehicle-side inlet, and has an engagement portion locked in the locking groove portion of the release lever at the non-locking position;
   wherein, in a movement process of the release lever from the start position to the completion position, the lock main arm is located at the locking position; and wherein, at the completion position of the release lever, the lock main arm is located at the non-locking position, and also the engagement portion is locked on the locking surface.

3. The charging connector according to claim 2, wherein the release lever has an abutment portion where the release lever abuts on the lock main arm to swing the lock main arm to the non-locking position, and
wherein the abutment portion is formed in a curved shape.

* * * * *